United States Patent [19]

Copenhaver et al.

[11] Patent Number: 4,648,046
[45] Date of Patent: Mar. 3, 1987

[54] EDITING AND REFLECTING COLOR DISPLAY ATTRIBUTES OF NON-ACTIVE PROFILES

[75] Inventors: Diane B. Copenhaver, Austin; E. Paul Devany; LaBrose Hedgemon, both of Round Rock, all of Tex.

[73] Assignee: International Business Machines Corporation, Armonk, N.Y.

[21] Appl. No.: 664,179

[22] Filed: Oct. 24, 1984

[51] Int. Cl.⁴ .................. G06F 3/153; G06F 15/02
[52] U.S. Cl. .................... 364/518; 340/701; 340/709; 364/300
[58] Field of Search ............... 364/200, 900, 518, 521, 364/300; 340/701, 703, 709, 747

[56] References Cited

U.S. PATENT DOCUMENTS

| | | | |
|---|---|---|---|
| 4,121,283 | 10/1978 | Walker | 364/200 |
| 4,139,838 | 2/1979 | Inose et al. | 364/900 X |
| 4,189,743 | 2/1980 | Schure et al. | 340/701 X |
| 4,232,311 | 11/1980 | Agneta | 340/703 |
| 4,233,601 | 11/1980 | Hankins et al. | 340/703 |
| 4,303,986 | 12/1981 | Lans | 364/900 |
| 4,471,465 | 9/1984 | Mayer et al. | 364/900 |
| 4,484,187 | 11/1984 | Brown et al. | 340/703 |
| 4,555,759 | 11/1985 | McCaskill et al. | 364/300 |

FOREIGN PATENT DOCUMENTS

| | | | |
|---|---|---|---|
| 122082 | 10/1984 | European Pat. Off. | 340/701 |
| WO8200726 | 3/1982 | World Int. Prop. O. | 340/703 |

*Primary Examiner*—Felix D. Gruber
*Attorney, Agent, or Firm*—Douglas H. Lefeve

[57] ABSTRACT

In a computer system in which a plurality of user profiles exist which contain specifications relative to a variety of parameters, the capability is provided to access and edit a profile other than the one which is presently active for the system. While all other specifications of the active profile are honored during editing of a non-active profile, the color specifications of the non-active profile are honored during editing of the color attributes portion of the non-active profile. Then, upon leaving the editing of color attributes of the non-active profile, the color attributes of the active profile are again honored for the remainder of the profile editing session.

9 Claims, 13 Drawing Figures

```
REVISE PROFILE  |LABROSE. UPR
USER PROFILE    |  |  |        |       |       |     |
                        CREATE OR REVISE PROFILE

ID  ITEM

A   CHANGE TEXT DEFAULTS
                   B   CHANGE WORK STATION DEFAULTS

WHEN FINISHED WITH THIS MENU, PRESS ENTER.

TYPE ID LETTER TO CHOOSE ITEM; PRESS ENTER: B
```

FIG. 2

```
REVISE PROFILE  |LABROSE. UPR
USER PROFILE    |  |  |        |       |       |     |
                        CHANGE WORK STATION DEFAULTS

ID  ITEM

A   CHANGE PRINTER DESCRIPTION
                   D   CHANGE PRINT OPTIONS

E   CHANGE KEYBOARD DESCRIPTION
                   F   CHANGE COLOR DISPLAY DESCRIPTION

G   CHANGE KEYSTROKES SAVE/RECALL
                       DEFAULT PATH

WHEN FINISHED WITH THIS MENU, PRESS ENTER.

TYPE ID LETTER TO CHOOSE ITEM; PRESS ENTER: F
```

FIG. 3

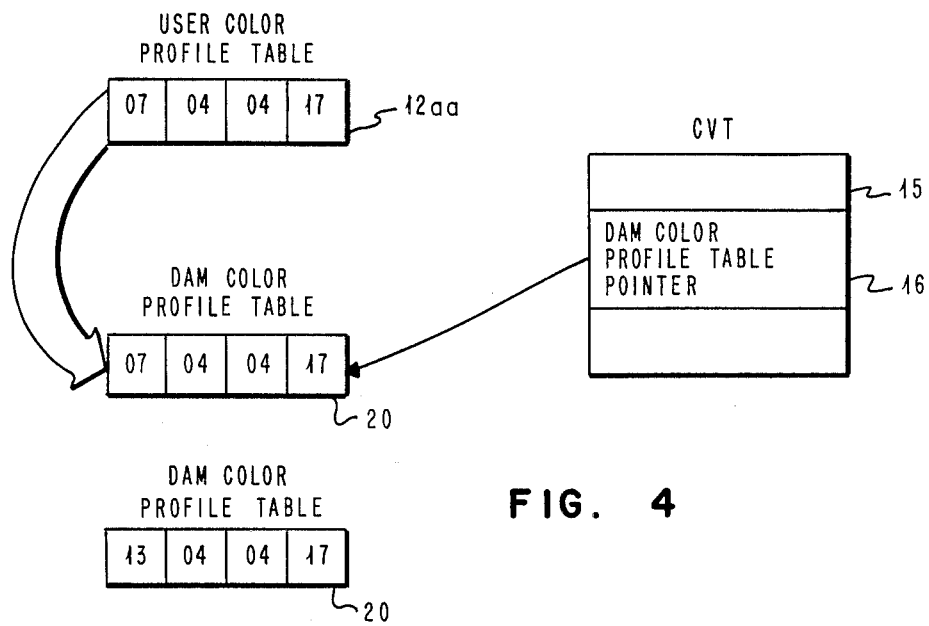

FIG. 4

```
CHANGE COLOR   |LABROSE.UPR
USER PROFILE   |   |   |        |       |          |
                  COLOR DISPLAY DESCRIPTION

COLOR
         ID   ITEM              CHOICE

A    MAIN COLOR        70
         B    UNDERSCORE        40
         C    CONTEXT FIELD     40
         D    MESSAGE LINE      71

0 BLACK  1 BLUE   2 GREEN  3 CYAN  4 RED  5 MAGENTA  6 YELLOW  7 WHITE

ENTER A TWO DIGIT NUMBER FOR COLOR SELECTION.
   FIRST DIGIT : FOREGROUND COLOR
   SECOND DIGIT: BACKGROUND COLOR

WHEN FINISHED WITH THIS MENU, PRESS ENTER.

TYPE ID LETTER TO CHOOSE ITEM; PRESS ENTER: A

TYPE YOUR CHOICE; PRESS ENTER: 31
```

FIG. 5

EDITING AND REFLECTING COLOR DISPLAY ATTRIBUTES OF NON-ACTIVE PROFILES

DESCRIPTION

1. Technical Field

This invention relates to word processing and computer systems utilizing both display devices and user profiles specifying values for certain system parameters. More particularly, this invention relates to a technique for editing and reflecting display attributes of a non-active user profile while a different user profile remains active.

2. Background Art

In recent years, there has been a great proliferation in small computer system hardware and in the various functions capable of being performed by such computer systems. Sophisticated applications programs are available to perform word processing, accounting, graphics composition, and data base management tasks. As the sophistication of these programs has increased, the applications' utilization of color cathode ray tube (CRT) display monitors has also greatly increased. The ability to use multiple colors has added a very significant new dimension in the simultaneous presentation of a variety of types of information.

As with almost any function capable of varying implementations, it is desirable to allow operators of computer system utilizing color displays a choice of colors for the various foregrounds and backgrounds of the different fields of information to be displayed. One way to provide this capability has been to allow the operator to alter a system profile which includes display parameters. Typically, such a system profile might be directed to a variety of devices in the system. Parameters relative to the keyboard, printer, storage diskette drives, and other devices in addition to the display device are addressed in such a profile. At the time that the values of the various parameters are chosen and saved in such a profile the effect that those values will have in the ultimate preparation and production of a job or performance of a task are not necessarily immediately obvious to the operator. For example, when the operator chooses to have the keyboard perform as an alphanumeric keyboard or a symbol keyboard, it is not immediately apparent to the operator what effect a particular keystroke with the chosen keyboard might have. Similarly, when display attributes are chosen by number, or even by color, but outside the context of the application in which they are to be used, the operator may still have some question about how the particular color choice will be displayed in the environment in which it is chosen to be used.

More recently, color display attribute editing has been allowed within a programming application so that the operator can immediately see the effect of the color choices. However, this approach has the two disadvantages of (a) requiring the application to be active to make the color choices and (b) requiring that the color choices stay with the application and be recreated for each application rather than staying with a system profile.

Still more recently, it has been suggested to allow editing of a profile and to immediately display the color changes that are made in the profile. Any fields in the profile menu being edited that are analogous to fields which exist in the applications are altered immediately, during editing, so that the operator can observe the effect of the changes in their natural context without being in the application itself. With such an approach, the profile being edited was active with respect to the operation of the system. In other systems allowing the creation or editing of a non-active one of a plurality of multiple profiles, neither the colors associated with the non-active profile being edited, nor the changes made to the colors during editing, were displayed to the operator until that profile was activated.

It would, therefore, very significantly increase the usability of a computer system including a color display device to provide ready and immediate access to non-active profiles and allow editing changes to be made while immediately reflecting the effect of these changes in a context comparable to that of the application in which the changes will be utilized.

DISCLOSURE OF THE INVENTION

Accordingly, in a computer system which allows a plurality of user profiles to exist which address a variety of parameters, the capability is provided to access and edit a profile other than the one which is presently active for the system. Since the active profile, itself, contains fixed or chosen specifications for color attributes, those specifications continue to be honored while editing all sections of the non-active profile being edited except during the editing of the section of the non-active profile which pertains to the display of colors. When editing this section, the color choices made during editing are immediately reflected so that the operator can consider the effect of the choices in a context comparable to that in which the colors will be displayed in the applications, themselves. Immediately upon leaving the panels of the non-active profile pertaining to colors, the display colors revert to those of the active profile. With this technique, not only are the choices made by the operator in editing the colors of a non-active profile immediately apparent, but a comparison of these colors to those of the active profile is readily available by paging back and forth, during this editing session, between the color choice menu panels and the menu panels associated with other system functions.

The above solution is accomplished by the use of a display pointer technique in the system that allows multiple tables of color values to exist. By manipulating the pointer, the colors displayed by the system can be immediately changed from the colors of the active profile to the colors of the non-active profile, without actually activating the non-active profile. Thus, during normal system operations, this pointer points to the color values in the active profile. This is also true when entering an editing session relative to a non-active profile. When a non-active profile is to be edited, the tables for the non-active profile overlay the active profile tables in memory. Before the overlay takes place, a copy of the active profile tables are saved in another location of memory. The pointer is changed to point to this copy of the color values which represent the active profile values. During editing of the color values in this non-active profile, the pointer to the color values table is changed to point to the table in the non-active profile. Therefore, the colors displayed at this point in the editing session are the colors of the non-active profile, which allows the operator to see the colors being changed as they would appear in normal operation. Upon completion of the color portion of the editing session, the color values are saved in the non-active profile table, but the pointer is once again changed to the table of the active profile and subsequent menus during this editing session of a non-active profile are displayed in the active profile colors, unless or until the operator once again returns to editing the display colors during this editing session.

The foregoing and other objects, features, extensions, and advantages of the invention will be apparent from the following more particular description of a preferred embodiment of the invention, as illustrated in the accompanying drawings.

BRIEF DESCRIPTION OF DRAWING

FIGS. 2 and 3 are typical display panels used in choosing particular portions of a profile to be created or edited.

FIG. 4 is a block diagram of the data flow in a computer system during editing of a non-active profile while another profile remains active.

FIG. 5 is a typical display panel used in a computer system for interactively editing the color parameters of a profile.

BEST MODE FOR CARRYING OUT THE INVENTION

Figure 1:
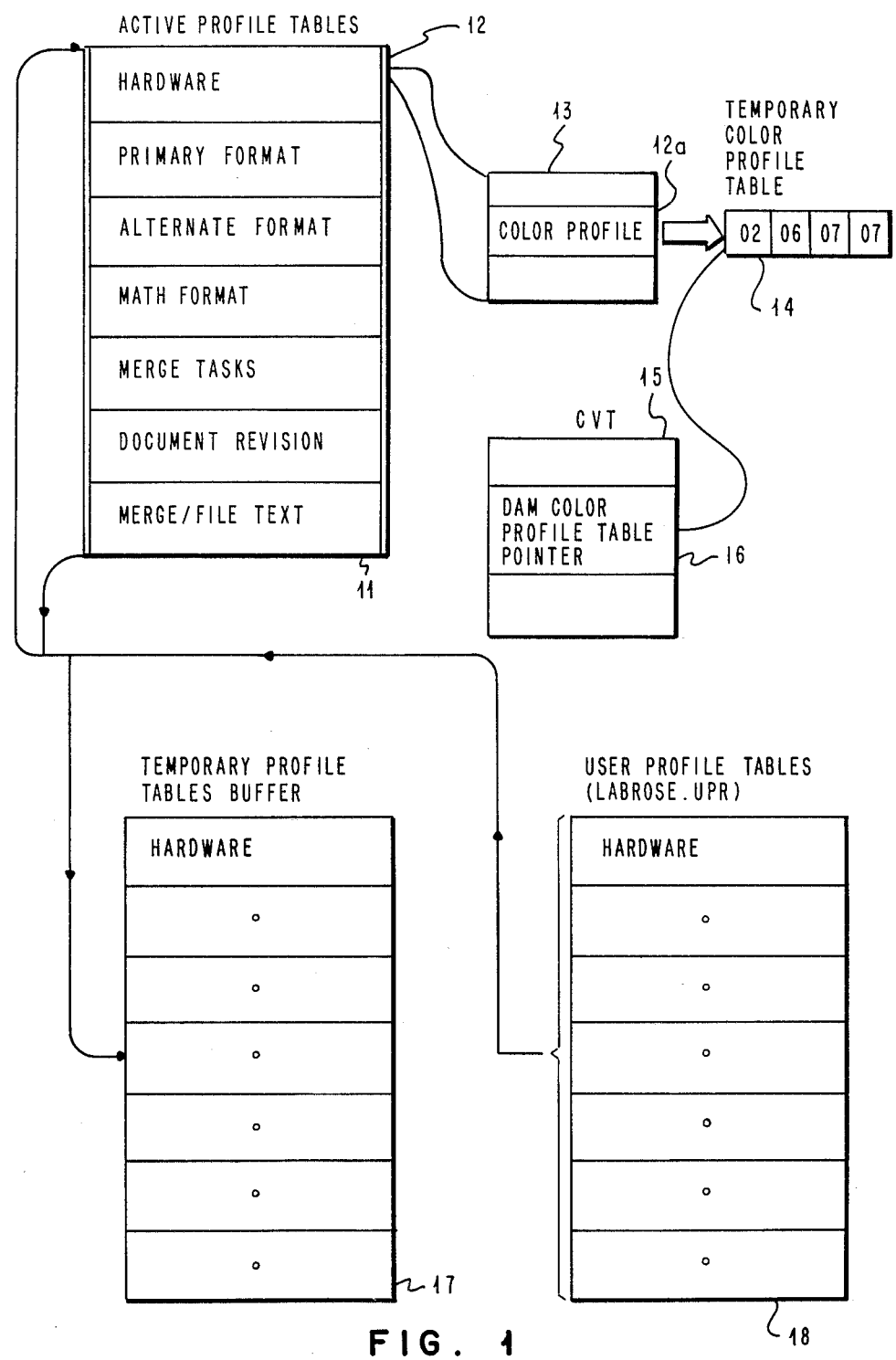
FIG. 1 is a block diagram of the data flow for readying a data processing system for performing editing operations in a non-active profile while another profile remains active.

Beginning with reference to the block diagram of FIG. 1 and the flow chart of FIGS. 9a-9e, a dedicated portion 11 of a computer system random access memory (not shown) stores a profile table in which a number of parameters relative to the operation of both computer system hardware and application software may be specified. For example, within such a profile there may be hardware specifications regarding the type of keyboard to be assumed by the system, the type of printer to be assumed by the system and other such assumptions relative to the input/output devices of the system, including a CRT display. This invention is related to editing of such a profile and has application during editing of the entire profile, including editing related to many other parameters including document formats, document revision, and merging and file tasks.

Referring now to the programming flow chart of FIGS. 9a-9e, for an editing session of a non-active profile, at 91 the operation is begun by operator selection of a menu item entitled "Profile Task" from a task selection menu of an application program for the computer system. In FIG. 1, the hardware portion 12 of the currently active profile stored in the dedicated portion 11 of the random access memory is pictorially shown as block 13 in an enlarged format. This hardware portion 12 of the active profile includes a color profile table 12a. At 92 the color profile table 12a, which includes the specifications for foreground and background colors of various fields shown on the display screen when using the application program, is copied into a temporary color profile table buffer 14 in the random access memory.

A communication vector table (CVT) 15, also stored in the random access memory, includes a display access method (DAM) color profile table pointer 16. The pointer stored at 16 can be set to point to various locations within the random access memory which the display access method can address to receive one set of data relative to color specifications according to which the display is to be operated, including foreground and background colors of various fields capable of being displayed. Thus, at 93 this pointer 16 is set to point to the color portion of the active profile which is presently being stored at buffer 14.

When the above operations have been accomplished, at 94 a "Profile Task" menu panel is displayed to allow the operator to choose to create or revise a profile, to activate a different profile, or to return to the task selection menu panel described above. At 95, assuming the operator has chosen to revise an existing, non-active profile, the operator enters the name of the non-active profile to be revised or edited and, at 96 this non-actrve profile is accessed, typically from a magnetic media storage device. For the purposes of the remainder of this description, it will be assumed that the name entered for the non-active profile to be revised was "LABROSE.UPR". When this user profile to be edited is accessed from the magnetic media storage it is written into a buffer 18 in the random access memory.

At 97, the currently active profile stored at location 11 of the random access memory is copied into a temporary profile tables buffer 17 in the random access memory. Then, at 98 the non-active user profile to be edited is copied from buffer 18 into portion 11 of the random access memory.

Next, at 99 a "Create or Revise Profile" menu panel such as the one shown in FIG. 2, is displayed to the operator. At 100, it is assumed that the operator has selected the option "Change Work Station Defaults" and a "Change Work Station Defaults" menu panel, such as the one shown in FIG. 3, is then displayed to the operator at 101. At 102 it is assumed that the operator has chosen option "f" to change the color display description relative to this non-active profile.

Referring now to FIG. 1, since the user profile table to be edited is now stored at portion 11 of the random access memory, the color profile portion 12a of the hardware profile 12 is now the user color profile table to be edited, rather than the active color profile table under which the system continues to operate. This user color profile table portion 12a of the hardware profile 12 is also shown in FIG. 4 and is here depicted with reference numeral 12aa. At 103, this user color profile table 12aa is copied into a private DAM color profile table buffer 20. When buffer 20 has been written, the CVT DAM color profile table pointer 16 is reset to now point to the user color profile table now being stored in buffer 20.

Figure 9A:
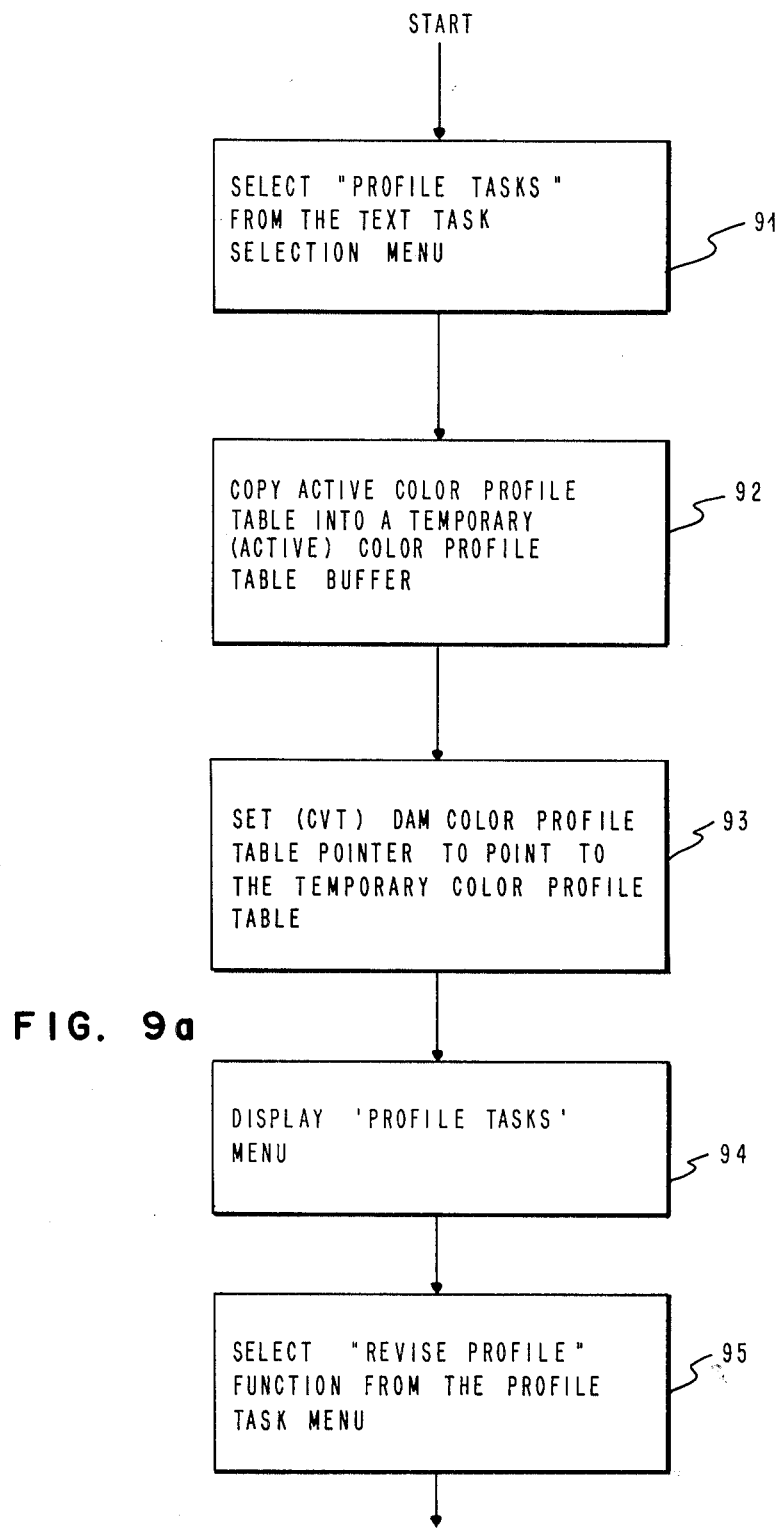
FIGS. 9a-9e is a programming flow chart which describes the logical operations performed by the system hardware to provide for interactive editing and reflecting color display attributes of non-active profiles.
Figure 9B:
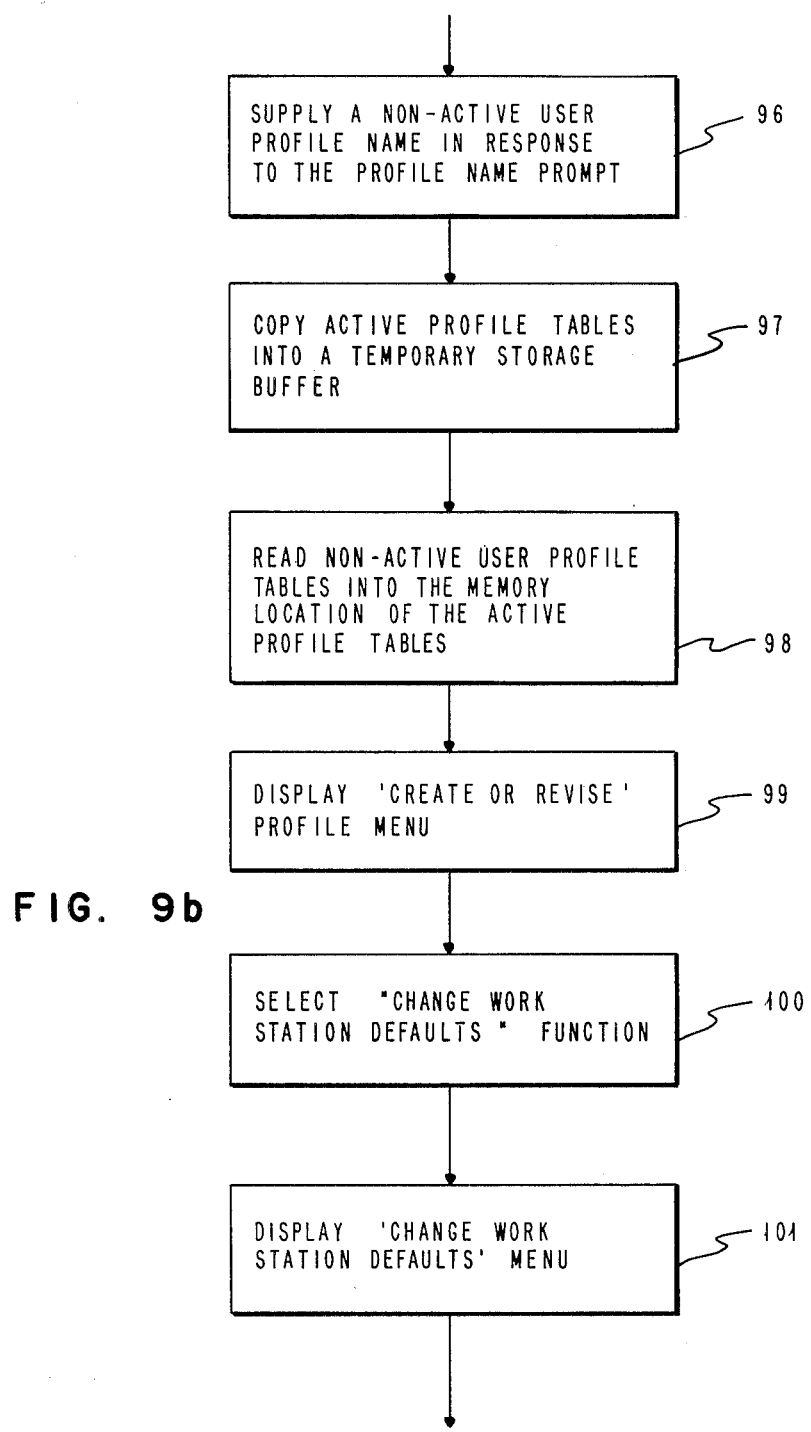
Figure 9C:
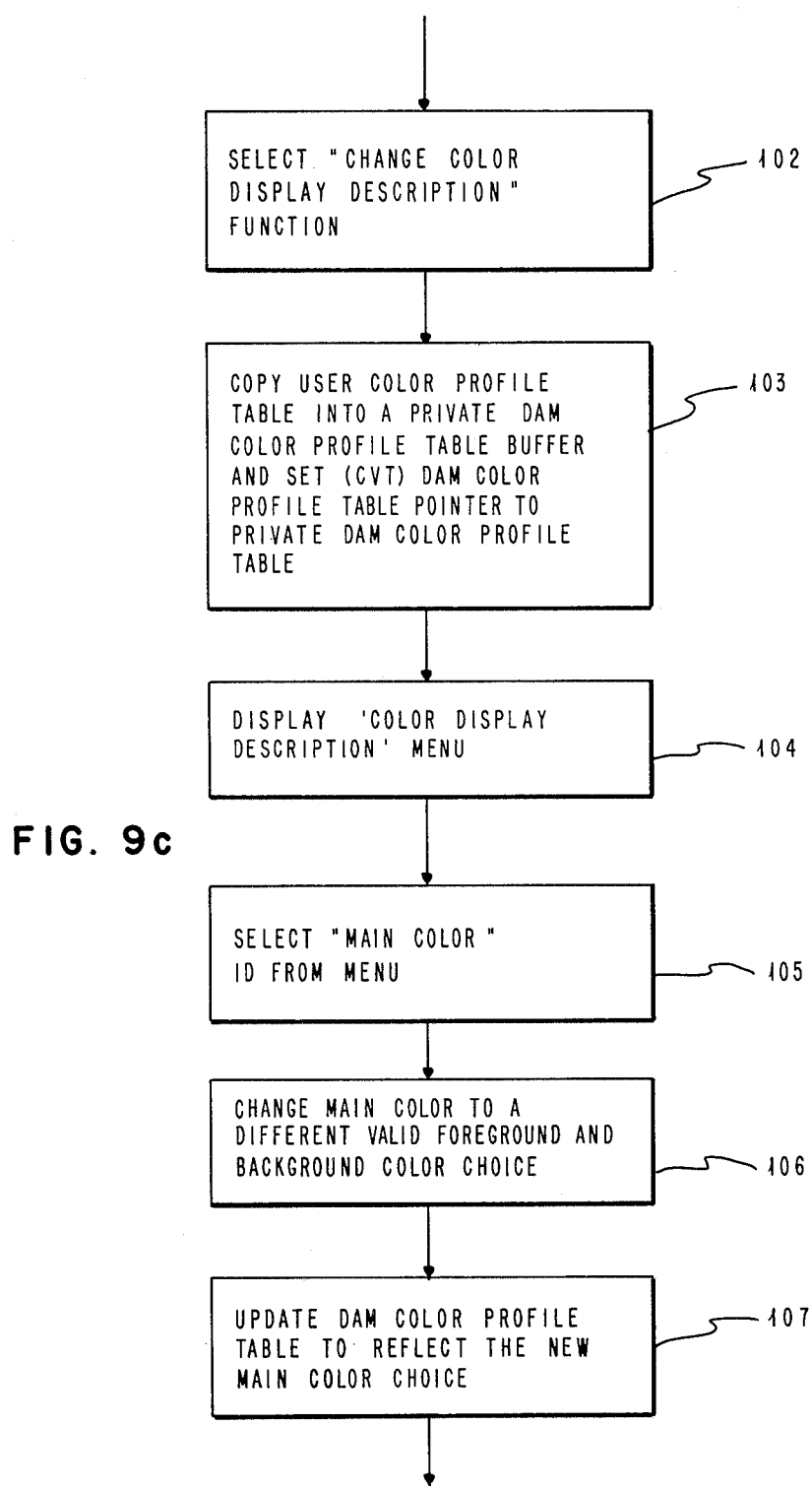
Figure 9D:
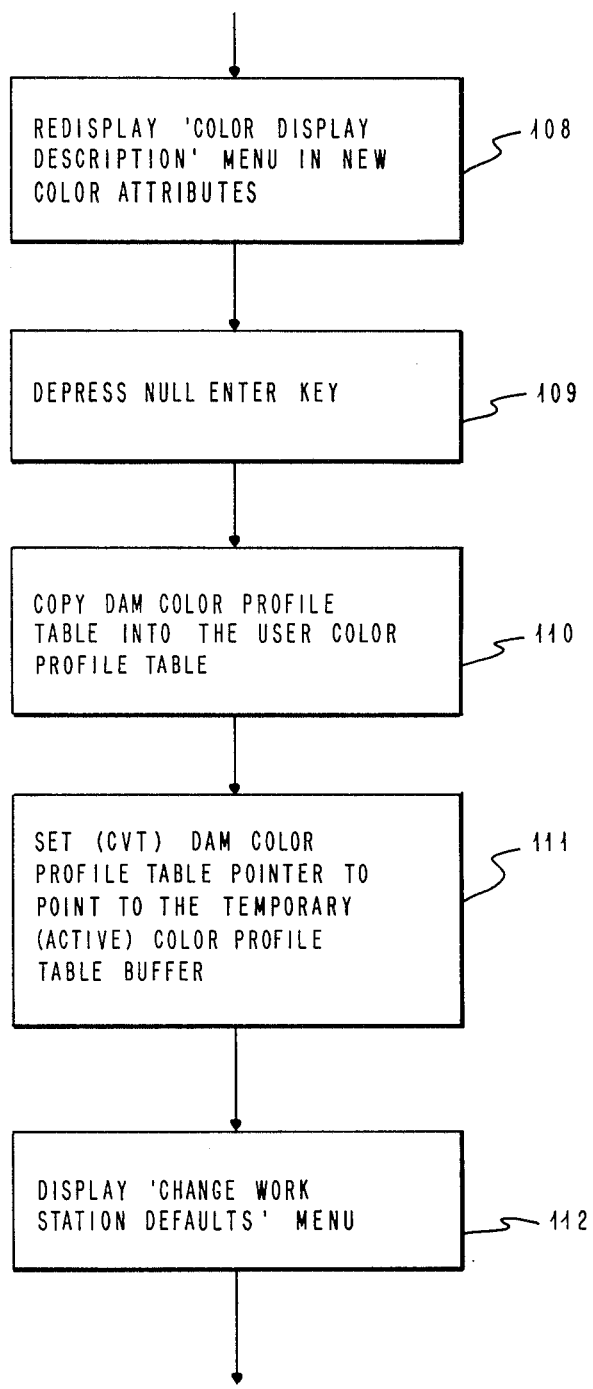
Figure 9E:
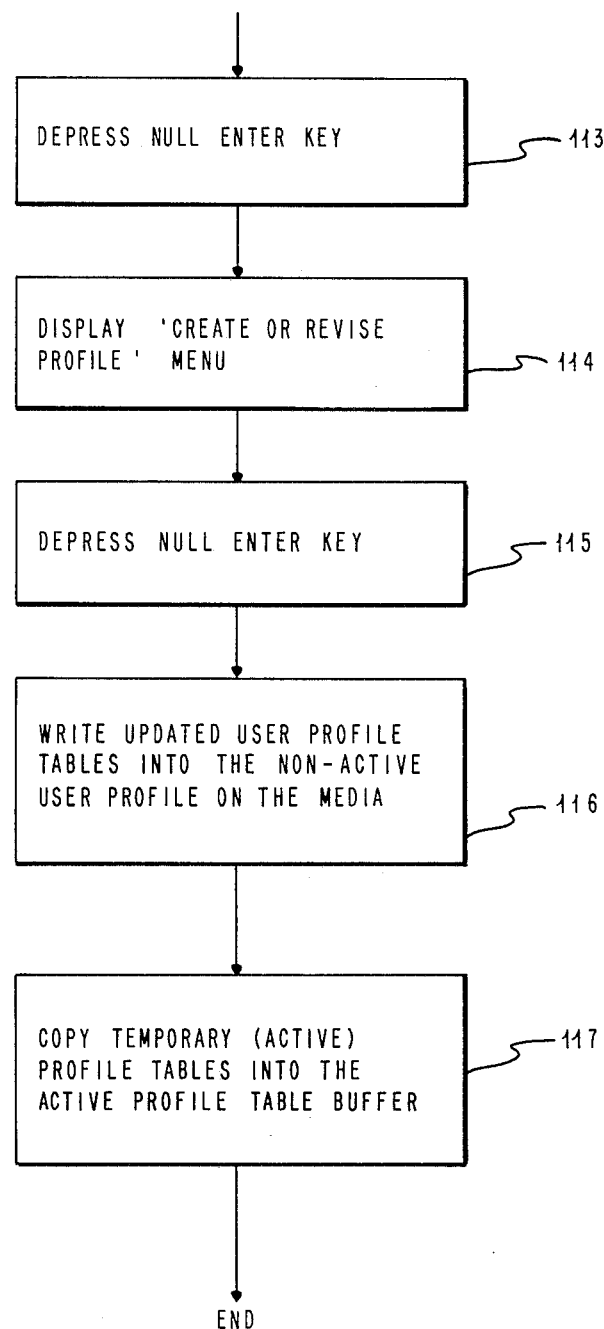

It will be remembered that prior to 103 in FIG. 9c, the DAM color profile table pointer 16 was set to point to the color profile table stored in buffer 14 which is the color profile table of the active profile under which the system is operating. Only upon selection of the "Change Color Display Description" menu choice at 102 was this DAM color profile table pointer reset to point to a buffer which contains the color profile table of the non-active profile being edited. Continuing then at 104, the "Color Display Description" menu panel is displayed to the operator to allow interactive choices to be made of various color fields as described by the menu panel. At 105, it is assumed that the operator has selected the identifier "a" to change the foreground and background colors for the "main color". At 106, it is assumed that the operator has chosen to change the main color from a foreground of green and a background of black to a foreground of cyan and a background of blue. Upon depression of the ENTER key, at 107 the private DAM color profile table buffer 20 is immediately updated to reflect the operator's main color change. Thus, since the DAM color profile table pointer 16 continues to point to this buffer 20 with new values, at 108 the "Color Display Description" menu is now displayed with the new color attributes just chosen by the operator.

Figure 6:
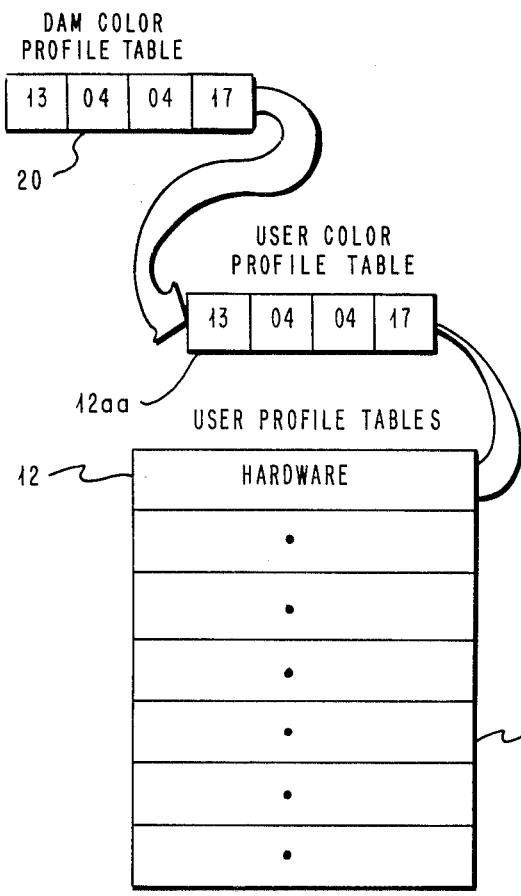
FIGS. 6 and 7 are block diagrams of the data flow in a computer system during completion of an editing session relative to the color parameters of a non-active profile.
Figure 7:
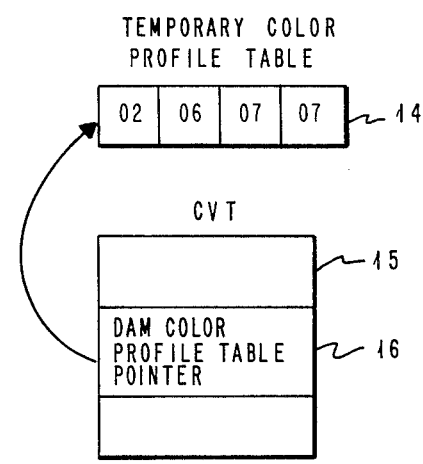

Assuming now that the operator is satisfied with the change made to the main color in the LABROSE.UPR Profile, the operator again presses the ENTER key at 109. Then, at 110 the final contents of the private DAM color profile table buffer 20 are transferred, as shown in FIG. 6, to the user color profile table portion 12aa of the hardware profile portion 12 of the user profile tables currently resident in portion 11 of the random access memory. Next, as shown in FIG. 7, at 111 the DAM color profile table pointer 16 is again reset to point to the temporary color profile table buffer 14 which, it will be remembered, contains the color specifications of the active profile. At 112 the "Change Work Station Defaults" menu panel of FIG. 3 is presented to the operator for choosing additional items to be changed relative to the LABROSE.UPR profile. However, it will be noted that the foreground and background color of the main color now being displayed to the operator are not those just chosen and saved during editing in the "Color Display Description" menu. Instead, the foreground and background colors of the main color have reverted back to the colors of the currently active profile. This helps remind the operator that a different profile is active other than the one being edited.

Figure 8:
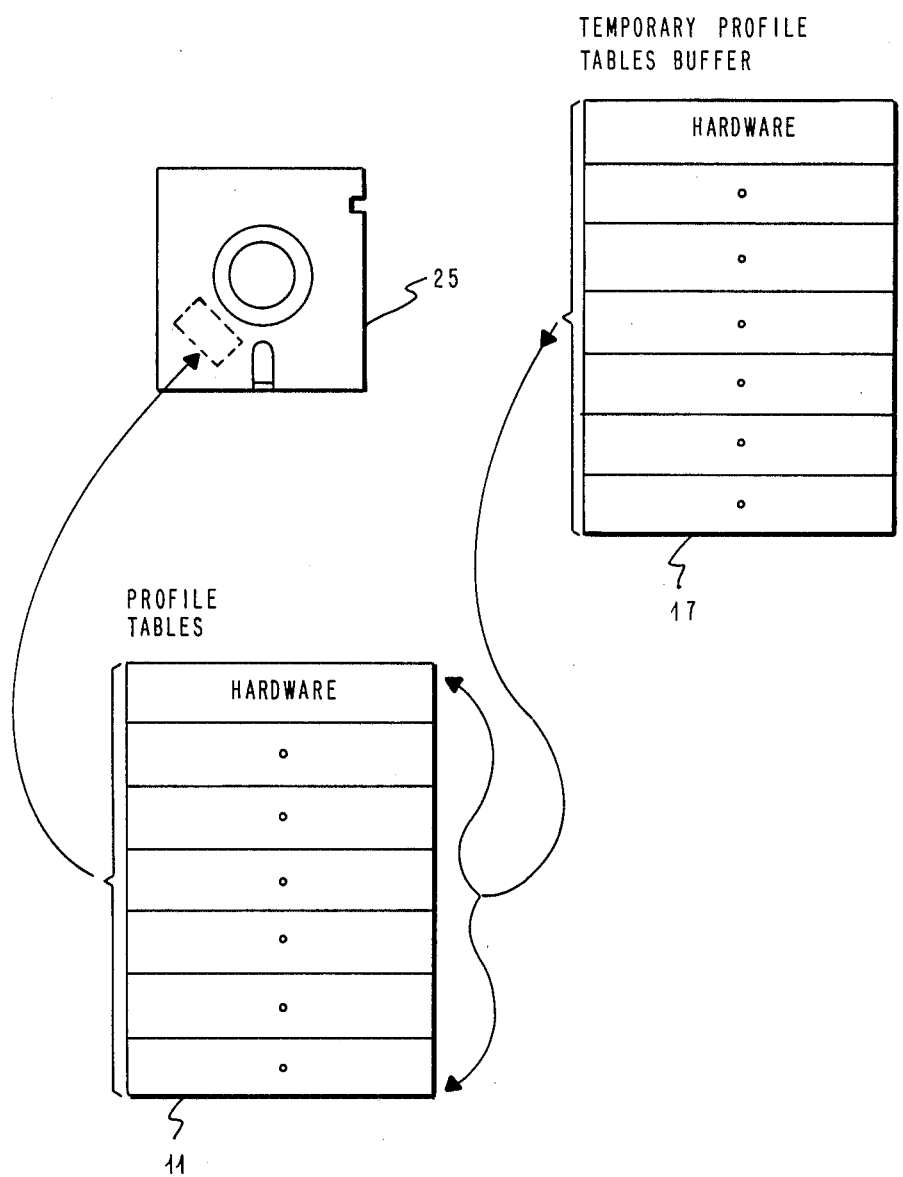
FIG. 8 is a block diagram of the data flow in a computer system after the completion of an editing session of a non-active profile and during restoration of the system to its state prior to editing.

With the "Change Work Station Defaults" menu panel being displayed, assume that the operator is finished with this menu and, therefore, depresses the ENTER key as stated at 113. This causes the "Create or Revise Profile" menu of FIG. 2 to be displayed as indicated at 114. Next, assume the operator has completed revision of the LABROSE.UPR profile and, therefore, depresses the ENTER key at 115. Referring now to FIG. 8, at 116 the updated, non-active profile presently stored in portion 11 of the random access memory is written to a storage device such as a diskette 25. Then, at 117 the active profile currently stored in the temporary profile tables buffer 17 is rewritten to portion 11 of the random access memory as it existed before the editing operation occurred. The color profile portion 12 of the active profile continues to reside in the temporary color profile table 14 and the DAM color profile table pointer 16 in the CVT continues to point to this buffer 14 which contains the color profile portion of the active profile. Thus, the system has been restored to the state that existed before the profile editing session.

The following programming design language listing is another form of the description of the above technique of editing and reflecting the color display attributes of a non-active user profile. This listing parallels the operation described above relative to FIGS. 1–9.

1. BEGIN (REFLECTING NON-ACTIVE COLOR ATTRIBUTES)
1. Display 'Text Task Selection' menu
1. IF Profile Tasks application selected, THEN
2. Copy active color profile table into a temporary (active) color profile table buffer
2. Set (CVT) DAM color profile table pointer to point to the temporary color profile table
2. Display 'Profile Tasks' menu
2. IF Revise Profile function selected, THEN
3. Display profile name prompt
3. IF valid non-active user profile name supplied in response to the prompt, THEN
4. Copy active profile tables into a temporary storage buffer
4. Read non-active user profile tables into the memory location of the active profile tables
4. Display 'Create or Revise Profile' menu
5. IF Change Work Station Defaults function selection, THEN
6. Display 'Change Work Station Defaults' menu
6. IF Change Color Display Description function selected, THEN
7. Copy user color profile table into a private DAM color profile table buffer
7. Set (CVT) color profile table pointer to point to the private DAM color profile table buffer
7. Display 'Color Display Description' menu
7. IF main color option is chosen, THEN
8. IF valid foreground and background main color choice is selected, THEN
9. Update DAM color profile table to -continued

```
       reflect the new main color
       choice
  9.  Redisplay 'Color Display
      Description' menu in the
      new color attributes
  9.  IF NULL ENTER key is depressed,
      THEN
 10.  Copy DAM color profile table
      into the user color profile
      table
 10.  Set (CVT) DAM color profile
      table pointer to point to the
      temporary (active) color
      profile table buffer
 10.  Display 'Change Work Station
      Defaults' menu
 10.  IF NULL ENTER key is depressed,
      THEN
 11.  Display 'Create or Revise
      Profile' menu
 11.  IF NULL ENTER key is
      depressed, THEN
 12.  Write updated user profile
      tables into the
      non-active user profile
      dataset on the media
 12.  Copy temporary (active)
      profile tables into the
      active profile table
      buffer
 12.  Display 'Profile Tasks'
      menu
 11.  ENDIF
 10.  ENDIF
  9.  ENDIF
  8.  ENDIF
  7.  ENDIF
  6.  ENDIF
  5.  ENDIF
  4.  ENDIF
  3.  ENDIF
  2.  ENDIF
  1.  ENDIF
  1.  END (REFLECTING NON-ACTIVE COLOR DISPLAY
      ATTRIBUTES)
```

In summary, a computer system organization has been described which allows a plurality of user profiles that address a variety of parameters to be accessed and edited while a different profile continues to be active for the system. The specifications of the active profile continue to drive the system, except that during editing of the color attributes in the non-active profile, those color specifications of the non-user profile are honored for color display purposes only. During such an editing session, as soon as editing of colors has ceased, the color profile portion of the active profile is again honored for the remainder of the profile editing session and during system operation which succeeds the editing session. While this allows the operator immediate feedback to the color editing choices during editing of a non-active profile, it also allows the operator to compare these colors to those of the active profile for potential further editing of the colors.

While the invention has been shown and described with reference to particular embodiments thereof, it will be understood by those skilled in the art that the foregoing and other changes in form and details may be made therein without departing from the spirit and scope of the invention.

What is claimed is:

1. A method of altering workstation specifications in a profile stored for a computer system including a color display device, comprising:

reading said stored profile into a data memory of said system;

editing workstation specifications in said profile as a non-active profile while said computer system is controlled by another active profile residing in a control memory of said system; and controlling color specifications for said display device with color attributes of said non-active profile only during editing of said color specifications of said non-active profile, whereby other edited workstation specifications cause no changes to said system operation while said non-active profile is edited.

2. The method of claim 1 further comprising:

establishing a pointer to provide a memory address for a portion of said memory at which is stored a color profile containing color specifications under which said display device operates.

3. The method of claim 2 further comprising:

copying an active color profile from said active profile into a first buffer.

4. The method of claim 3 further comprising:

copying a non-active color profile from said non-active profile into a second buffer.

5. The method of claim 4 further comprising:

setting said pointer to point to said second buffer during editing of color specifications of said non-active profile and to point to said first buffer during editing of other specifications in said non-active profile.

6. The method of claim 5 further comprising:
immediately updating the contents of said second buffer during editing of said non-active profile, whereby color changes are immediately reflected to an operator during editing of color specifications of said non active profile.

7. The method of claim 6 further comprising: saving in said memory the original color attributes of said non-active profile.

8. The method of claim 7 further comprising:
overwriting said original color attributes of said non-active profile with said updated contents of said second buffer in response to an operator decision to save said color changes.

9. The method of claim 8 further comprising:
recording on a storage device said non-active profile after said non-active profile has been overwritten with said color changes.

* * * * *